March 18, 1947. E. NASSIMBENE 2,417,512

BELT

Filed Feb. 13, 1943

ERNEST NASSIMBENE
    INVENTOR.

BY
Martin E Anderson
    ATTORNEY

Patented Mar. 18, 1947

2,417,512

UNITED STATES PATENT OFFICE 2,417,512

BELT

Ernest Nassimbene, Denver, Colo., assignor to Gates Rubber Company, Denver, Colo., a corporation of Colorado Application February 13, 1943, Serial No. 475,834

3 Claims. (Cl. 74—233)

This invention relates to improvements in belts and has reference more particularly to an improved construction of the V-type side driving belts.

Belts for the transmission of power are constantly flexed and straightened as they pass over and between the co-operating pulleys. The flexure of the belts as they pass around the pulleys has a tendency to compress the body inside of the neutral axis and to cause the same to alter its shape. This constant deformation of the material tends to heat it and also to produce abnormal pressures between the belt and the sides of the pulley, thereby generating a large amount of heat and increasing the wear on the sides of the belt. The amount of heat generated and the amount of pressure produced increase with the hardness of the material and the heat in turn tends to increase the hardness, thereby producing a progressive deterioration of the belt material which shortens its life.

It is the object of this invention to produce a belt of the type indicated, which shall have greater flexibility than the ordinary belts of this type and which will generate less heat per unit of power transmitted than similar belts now in common use.

The increased flexibility and the consequent decrease in the amount of heat generated reduces the factors that tend to destroy the belts and therefore prolong their lives.

Another object of this invention is to produce the effects pointed out above without changing the outside appearance of the belt or the molds and machines now employed in the manufacture of similar belts.

The above and other objects that may become apparent as this description proceeds are attained by means of a construction and an arrangement of parts that will now be described in detail, and for this purpose reference will be had to the accompanying drawing in which the invention has been illustrated in its preferred form, and in which.

Figure 1:
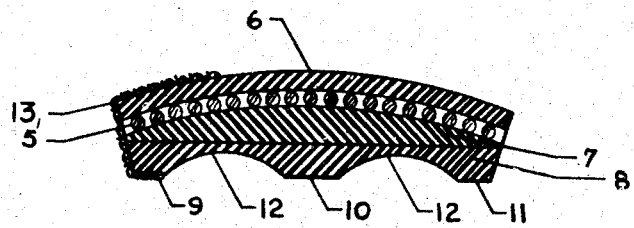
Figure 1 is a cross section showing one specific type of belt constructed in accordance with this invention.

Referring now more particularly to Figure 1, it will be seen that the belt consists of a transverse layer 5 of substantially inextensible cords. This layer is positioned at what may be termed the neutral axis of the belt and in Figure 1 it is shown as outwardly convex. The cord layer may be formed from several superposed layers of rubberized cord fabric, although only a single layer has been indicated in the drawings. On the outside of the cord layer is a layer of rubber composition 6 which is of a hardness commonly employed as the outer layer of belts of this construction. Located on the inside of the cord layer is another layer of rubber composition which has been indicated by reference numeral 7. Layers 6 and 7 may be of substantially the same hardness, although in some instances it may be desirable to have layer 7 of slightly less hardness than layer 6. Positioned on the inside of layer 7 is an inner layer 8 of rubber-like material and this is so compounded as to be appreciably softer than the composition in layers 6 and 7. In the specific embodiment shown in Figure 1, the inner surface has been illustrated as formed from three annular strips 9, 10 and 11 separated by grooves or depressions 12. Such a belt is well adapted to transmit power between a flat surface pulley and a grooved pulley and belts of this particular cross sectional shape are often employed in that manner.

Figure 2:
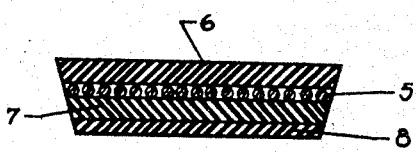
Figure 2 is a cross section of a belt of a slightly different form.

The belt illustrated in Figure 2 differs from that illustrated in Figure 1, principally in this, that the cord layer 5, as well as the inner and outer surfaces, are transversely straight. The outer layer 6, the intermediate layer 7 and the inner layer 8, have the same relationship as to hardness as those employed in the construction illustrated in Figure 1.

Figure 3:
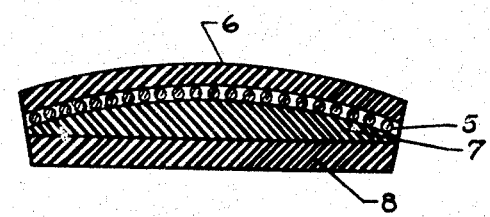
Figures 3, 4 and 5 show further modifications of the belt.

The belt illustrated in Figure 3 differs from that illustrated in Figure 1, principally in this, that the grooves 12 have been omitted, leaving the inner surface transversely straight.

Figure 4:
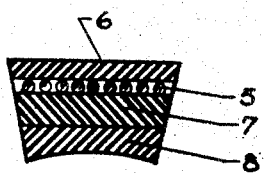

The construction shown in Figure 4 is similar to that shown in Figure 2 and differs therefrom merely in the width of the belt.

It is evident from the above that the specific shape of the belt can be altered materially, but in any case the inner layer 8 is composed of a rubber-like composition that is materially softer than that employed in the layers 6 and 7 and which is therefore more readily compressible than the said layers. The result of employing this softer composition is that due to its greater flexibility, less energy will be consumed in deforming it as it is bent around the pulleys and due to the decrease in energy a corresponding decrease in the amount of heat generated also results therefrom.

The belt may be covered on its outer surface by bias cut rubberized fabric 13 in the manner quite common in the construction of belts of this type. The outer fabric covering, however, is optional.

Attention is called to the fact that the rubber-like material of bodies 7 and 8 are free from woven fabric as well as fibers extending transversely thereof. Belts of the construction shown and described above have been found to have a longer life than belts of a similar construction in which the entire inner body of the belt, represented by the two layers 7 and 8, are of the same hardness as the layer 7. As above pointed out, the increased life is believed to be due principally to the fact that less heat is generated during operation as it is well known that heat reduces the useful life of belts.

The greater flexibility of the inner layer serves to exert a lesser pressure against the sides of the pulley during the deformation and this in turn reduces the amount of wear along the inner edges of the belt and thus prevents the belt from wearing excessively and as a result of this the driving stresses are more uniformly distributed over the entire area of the friction surfaces.

For practical reasons only two layers 7 and 8 have been shown on the inside of the cord layer. Theoretically, a large number of thin layers increasing in softness towards the inner surface would be preferable, the ideal being a body that decreases in hardness uniformly toward the inner surface. Such a body would not have the sharp line of demarcation of a two part body.

Figure 5:
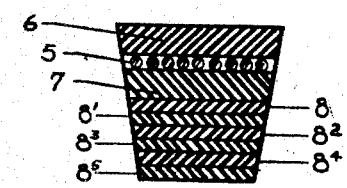

In Figure 5, a belt constructed as described in the paragraph next above, has been illustrated. Instead of a single layer 8, as shown in Figures 1 to 4, six layers have been shown and designated as 8, $8^1$, $8^2$, $8^3$, $8^4$ and $8^5$. The layers increase in softness from 7 to $8^5$.

Having described the invention, what is claimed as new is:

1. A belt of the edge driving V-type having a layer of substantially inextensible cords, an outer layer of readily bendable rubber-like composition and an inner body of rubber-like composition, formed from a plurality of layers, the hardness of the material in the layers inside of the layer of cords decreasing towards the inner surface of the belt, the resistance to forces tending to deform the belt decreasing progressively from the cord layer to the inner surface of the belt.

2. A belt of the edge driving V-type comprising a body, having a layer of substantially inextensible cords, an outer layer of readily bendable rubber-like composition, a layer directly inside of the cord layer and formed from rubber-like composition having substantially the same hardness as the outer layer, and an innermost layer of rubber-like composition of substantially less hardness than the layers adjacent the cord layer, which will deform more readily when subjected to compressive strains while passing around a pulley than the outer layer.

3. A belt of the edge driving V-type comprising four layers of material, one of which is composed of substantially inextensible cords, a layer of readily bendable rubber-like composition on the outer surface of the cord layer, a layer of rubber-like composition on the inside of the cord layer, the two layers of rubber-like composition being of substantially the same hardness, and an innermost layer of rubber-like composition of less hardness than the other two, the innermost layer yielding more readily to the distorting forces produced when the belt passes around a pulley than either of the other two.

ERNEST NASSIMBENE.

REFERENCES CITED

The following references are of record in the file of this patent:

UNITED STATES PATENTS

| Number | Name | Date |
| --- | --- | --- |
| 2,294,821 | Yelm | Sept. 1, 1942 |
| 2,086,804 | Hjartsater | July 13, 1937 |
| 1,981,644 | Carter et al. | Nov. 20, 1934 |
| 1,768,348 | Wescott | June 24, 1930 |
| 2,182,461 | Yeakel | Dec. 5, 1939 |